United States Patent [19]

Nilssen

[11] Patent Number: 5,070,522
[45] Date of Patent: * Dec. 3, 1991

[54] COMBINED SIGNAL AND POWER DISTRIBUTION SYSTEM

[76] Inventor: Ole K. Nilssen, Caesar Dr., Barrington, Ill. 60010

[*] Notice: The portion of the term of this patent subsequent to Sep. 12, 2006 has been disclaimed.

[21] Appl. No.: 397,266

[22] Filed: Aug. 23, 1989

Related U.S. Application Data

[63] Continuation-in-part of Ser. No. 136,505, Dec. 23, 1987, Pat. No. 4,866,757, which is a continuation of Ser. No. 921,381, Oct. 22, 1986, abandoned.

[51] Int. Cl.[5] .................................. H04M 11/00
[52] U.S. Cl. .................................. 379/90; 379/397; 379/453; 174/115; 307/150; 307/157
[58] Field of Search .................. 379/90, 397, 387, 58, 379/110, 453, 457; 174/115; 307/326, 151, 157, 150; 323/247, 305

[56] References Cited

U.S. PATENT DOCUMENTS

| | | | |
|---|---|---|---|
| 2,180,731 | 11/1939 | Dickinson | 174/115 |
| 3,210,648 | 10/1965 | Lockie | 323/247 |
| 3,445,969 | 5/1969 | Sherron | 379/453 |
| 4,441,143 | 4/1984 | Richardson | 379/453 |
| 4,533,790 | 8/1985 | Johnson et al. | 174/115 |
| 4,899,217 | 2/1990 | MacFadyen et al. | 358/86 |

Primary Examiner—Stafford D. Schreyer

[57] ABSTRACT

From a central point, both telephone signals and Class-2 high frequency electric power are transmitted by way of a common transmission cable to the location of a telephone apparatus; thereby to provide at that location, not only telephone signals, but also a limited amount of electric power useful for various things, such as task lighting. At the central point there is provided a non-interruptible source of electric energy, namely a frequency-converting power supply connected both with an ordinary 120 Volt/60 Hz power line as well as with a storage battery. This power supply provides output of Class-2 high frequency voltage. Together with the telephone signals, this Class-2 voltage is transmitted by way of an ordinary telephone installation cable to the location of a telephone apparatus. At that location, some of the wires in the telephone installation cable are connected with the telephone apparatus, and some of the wires in the telephone installation cable are connected with a fluorescent task lighting fixture designed to be properly powered from the Class-2 power-limited high frequency voltage.

8 Claims, 1 Drawing Sheet

COMBINED SIGNAL AND POWER DISTRIBUTION SYSTEM

RELATED APPLICATIONS

This application is a Continuation-in-Part of Ser. No. 07/136,505 filed 12/23/87 now U.S. Pat. No. 4,866,757; which is a continuation of Ser. No. 06/921,381 filed 10/22/86, now abandoned.

BACKGROUND OF THE INVENTION

1. Field of Invention

The present invention relates to a system for providing to the location of a telephone apparatus both telephone signals and electric power by way of a single ordinary multi-conductor telephone installation cable.

2. Elements of Prior Art

At many locations where a telephone apparatus is installed, such as at certain telephone booths, electric power is required to provide for desired functions ancillary to the use of the telephone apparatus. A typical such ancillary function is lighting suitable to permit convenient use of the telephone apparatus and of a telephone directory.

In such cases, the telephone signals are transmitted by way of an ordinary multi-conductor telephone installation cable, and ordinary 120 Volt/60 Hz electric power is transmitted by way of a different and completely separate cable.

In view of the National Electrical Code and the requirements of Underwriters Laboratories Inc. (U.L.), it would not be permissible to transmit the ordinary 120 Volt/60 Hz power line voltage along with the telephone signals in an ordinary multiconductor telephone installation cable.

SUMMARY OF THE INVENTION

1. Objects of the Invention

An object of the present invention is that of providing an improved means for providing electric power to the location of a telephone apparatus.

This as well as other objects, features and advantages of the present invention will become apparent from the following description and claims.

2. Brief Description

In its basic preferred embodiment, the present invention consists of the following elements:

a) at a first location: i) a set of telephone terminals connected in circuit with an ordinary telephone utility signal line, and ii) a frequency-converting power supply connected with an ordinary electric utility power line, as well as with a storage battery means, and operative to provide at a set of Class-2 power terminals a 30 Volt/20 Khz current-limited voltage;

b) at a second location: i) a telephone apparatus having a set of apparatus terminals, and ii) a fluorescent lighting means having a set of lighting terminals; and c) an ordinary multi-wire telephone installation cable having a first set of conductors and a second set of conductors, this telephone installation cable being operative to provide signal and power transmission between the first location and the second location, the first set of conductors being connected with the telephone terminals at the first location and with the apparatus terminals at the second location, the second set of conductors being connected with the Class-2 power terminals at the first location and with the lighting terminals at the second location.

DESCRIPTION OF THE PREFERRED EMBODIMENT

Details of Construction

Figure 1:
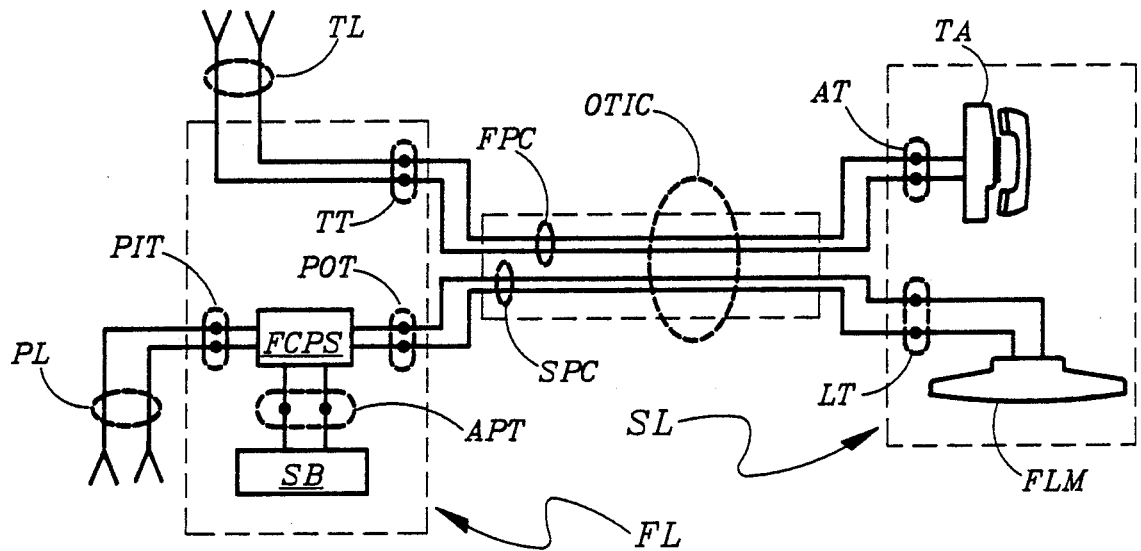
FIG. 1 provides an overall schematic view of the preferred embodiment of the present invention.

FIG. 1 illustrates the overall arrangement of the preferred embodiment of the present invention.

In FIG. 1, a telephone line TL and a power line PL both come into a first location FL and connect with a pair of telephone terminals TT and a pair of power input terminals PIT, respectively.

A frequency-converting power supply FCPS is connected with power input terminals PIT, and provides its output at power output terminals POT. A storage battery SB is connected with frequency-converting power supply FCPS by way of a pair of auxiliary power terminals APT.

At a second location SL, a telephone apparatus has a pair of apparatus terminals AT; and a fluorescent lighting means FLM has a pair of lighting terminals LT.

An ordinary telephone installation cable OTIC has a first pair of conductors FPC and a second pair of conductors SPC. The first pair of conductors is connected between telephone terminals TT and apparatus terminals AT; and the second pair of conductors is connected between power output terminals POT and lighting terminals LT.

Figure 2:
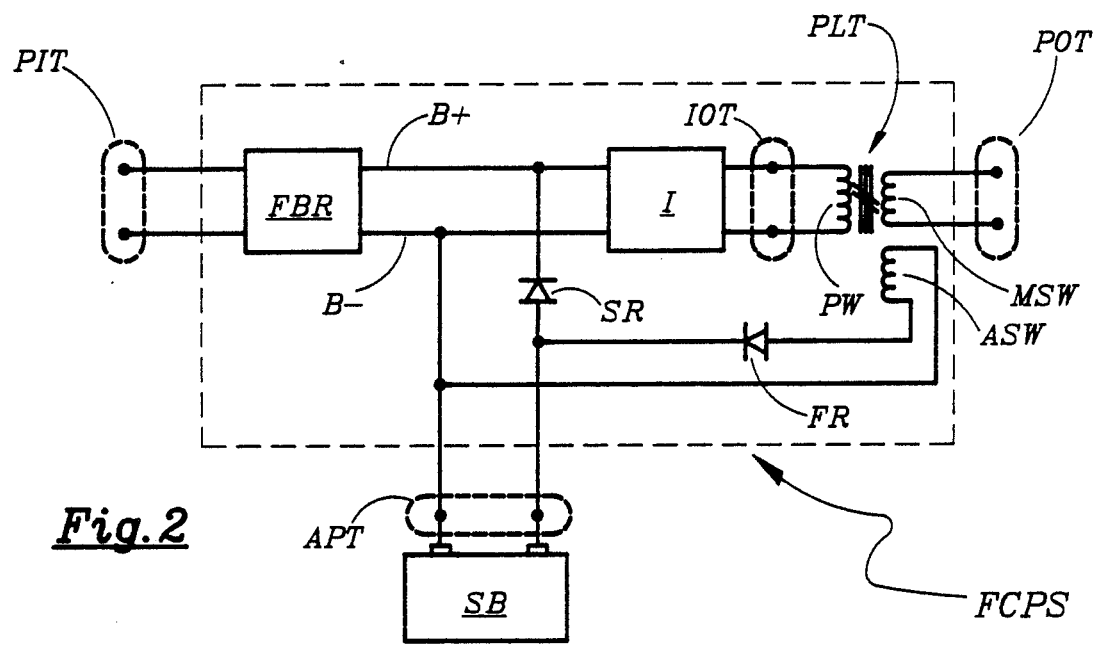
FIG. 2 provides details in respect to the frequency-converting power supply.

FIG. 2 provides details of frequency-converting power supply FCPS and its relationship with storage battery SB.

In FIG. 2, a full bridge rectifier FBR is connected with power input terminals PIT and provides its rectified output voltage between a B+ bus and a B− bus. An inverter I is connected with the B+ bus and the B− bus, and provides an AC voltage at inverter output terminals IOT. A power-limiting transformer PLT has a primary winding PW connected across inverter output terminals IOT, a main secondary winding MSW connected with power output terminals POT, and an auxiliary secondary winding ASW connected between the B− bus and the anode of a first rectifier FR, whose cathode is connected with the anode of a second rectifier SR. The cathode of second rectifier SR is connected with the B+ bus.

Auxiliary power terminals APT are connected with the negative and positive terminals of storage battery SB in such manner that the negative terminal connects with the B− bus and the positive terminal connects with the anode of second rectifier SR.

Figure 3:
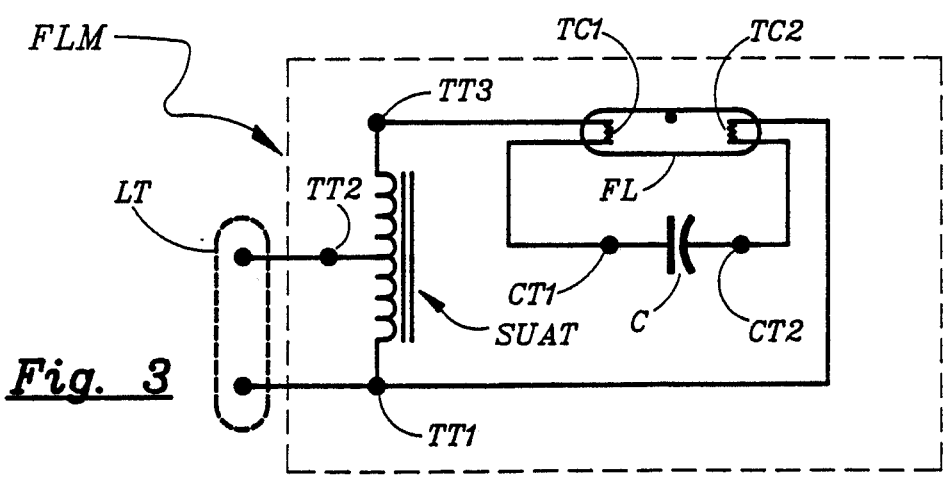
FIG. 3 provides details in respect to the fluorescent lighting means.

FIG. 3 provides details of fluorescent lighting means FLM.

In FIG. 3, a step-up auto-transformer SUAT has three transformer terminals TT1, TT2 and TT3. Transformer terminals TT1 and TT2 are connected with lighting terminals LT. Transformer terminal TT3 is connected with a first capacitor terminal CT1 of a capacitor C by way of a first thermionic cathode TC1 of a fluorescent lamp FL. A second capacitor terminal CT2 of capacitor C is connected with transformer terminal TT1 by way of a second thermionic cathode TC2 of fluorescent lamp FL.

Details of Operation

With reference to FIGS. 1-3, the operation of the preferred embodiment of the invention may be explained as follows.

With frequency-converting power supply FCPS connected with an ordinary 120 Volt/60 Hz power line, a 30 kHz squarewave voltage is provided at inverter output terminals IOT.

The output provided at power output terminals POT is also a 30 kHz voltage. However, due to internal magnetic leakage between primary and secondary windings in power-limiting transformer PLT, the maximum amount of current available from the POT terminals is manifestly and non-dissipatively limited. In particular, the output from the POT terminals is inductively limited in such manner as to meet the specifications in the National Electrical Code for Class-2 electrical circuits.

The output from the POT terminals is connected with a pair of conductors (SPC) in the more-or-less ordinary telephone installation cable OTIC. The telephone line is also connected with a pair of conductors (FPC) in cable OTIC. Thus, both Class-2 electric power as well as ordinary telephone signals are transmitted between the first location (FL) and the second location (SL) by way of an ordinary telephone installation cable (OTIC).

The first location would typically be some central location within a building; and the second location would typically be a telephone booth located some distance away from this building. However, the two locations might also both be located within a single building.

As long as the frequency-converting power supply (FCPS) is being powered by power line voltage from the power line (PL), the storage battery (SB) is being charged from the auxiliary secondary winding (ASW) on the power-limiting transformer (PLT). In the event of power failure, the inverter (I) will be powered from the storage battery; the voltage on which has a magnitude about half that existing between the B+ bus and the B− bus whenever power line voltage is present. Whenever the inverter is being powered by the storage battery, the magnitude of the voltage provided by the ASW winding is too low to cause battery charging.

The 30 Volt/30 kHz voltage provided by the FCPS power supply is transmitted to the fluorescent lighting means (FLM) in the second location (SL), thereby to provide illumination as might be useful in connection with using the telephone apparatus (TA).

In the fluorescent lighting means (FLM), the step-up autotransformer (SUAT) receives the 30 Volt/30 kHz inductively current-limited voltage from the POT terminals of the FCPS power supply and transforms it to a 100 Volt/30 kHz inductively current-limited voltage. In combination with capacitor C, this 100 Volt/30 kHz inductively current-limited voltage is appropriate for starting and powering the fluorescent lamp (FL) by way of series-resonant action.

Additional Comments a) For further details in respect to frequency-converting power supplies and series-resonant ballasting circuits for fluorescent lamps, reference is made to U.S. Pat. No. Re. 31,758 to Nilssen and U.S. Patent No. 3,710,177 to Ward.

b) The series-resonant ballasting circuit described by Ward is especially suitable for powering a fluorescent lamp over a wide range of different driving voltage magnitudes. In particular, reducing the driving voltage magnitude by a factor of two, reduces the lamp light output by less than a factor of two.

c) If it should happen that the distance between the first location (FL) and the second location (SL) is more than about 100 feet, it is advantageous to reduce the frequency of the driving voltage provided by the frequency-converting power supply (FCPS). In particular, for very large distances, it is anticipated that frequencies as low as 1 kHz may be used.

d) The maximum amount of power available from the power output terminals (POT) of the frequency-converting power supply (FCPS) is 100 Watt; which is the maximum amount permissible for Class-2 electrical circuits in accordance with the National Electrical Code.

e) It is expected that, in addition to use in connection with telephone booths and the like, the combined telephone and distribution system of FIG. 1 will find use in homes, offices, and the like; and that both telephone signals and Class-2 electric power will be available by way of ordinary telephonetype receptacle means. In particular, it is anticipated that the output from the frequency-converting power supply (FCPS) be provided at the point in a building from which the telephone signals are distributed, thereby to provide for both telephone signals as well as Class-2 electric power to be distributed by way of a common ordinary multiconductor telephone cable to multiple locations within the building: typically to the locations where telephone instruments are located.

f) The National Electrical Code is established by National Fire Protection Association, Batterymarch Park, Quincy, Mass. 02269. Its presently most up-to-date version is provided in a book entitled NATIONAL ELECTRICAL CODE 1984; which book is published by National Fire Protection Association. By reference, this book in general, and Article 725 thereof in particular, is herewith made part of this patent specification.

g) Article 725 of the National Electrical Code deals with power-limited circuits; which power-limited circuits are designated Class-1, Class-2, and Class-3 circuits.

Class-2 circuits refer to electrical circuits wherein: i) the maximum voltage available from or within the circuit is low enough in magnitude to be substantially free from electrical shock hazard to a person coming in direct electrical contact with terminals and/or other elements of the circuit, and ii) the maximum power available from or within the circuit is low enough to be substantially free of fire initiation hazard in case of an electrical malfunction, such as a short circuit.

Class-3 circuits refer to electrical circuits wherein: i) the maximum magnitude of any voltage available from or within the circuit is not higher than 150 Volt, and ii) the maximum power available from or within the circuit is low enough to be substantially free of fire initiation hazard in case of an electrical malfunction, such as a short circuit.

Under most conditions, the continuously available Volt-Ampere product from a Class-2 or Class-3 electrical circuit must be limited to a maximum of 100 Volt-Ampere; which means that the power available is correspondingly limited to a maximum of 100 Watt.

h) The output from the frequency-converting power supply (FCPS) of FIGS. 1 and 2 is limited in accordance with the specifications in the NATIONAL ELECTRICAL CODE 1984 for Class-2 circuits; which means that it also complies with the specifications for Class-3 electrical circuits. Thus, under most conditions, the Volt-Ampere product available from the POT terminals of the FCPS power supply on a continuous basis may be as high as, but will not exceed, 100 Volt-Ampere.

As indicated in FIG. 2, limitation of Volt-Ampere product output is attained by providing for manifest magnitude-limitation on available output current; which manifest magnitude-limitation is attained by providing for less than 100% coupling between primary winding PW and main secondary winding MSW on power-limiting transformer PLT. Thus, current magnitude-limitation is attained by non-resistive or non-dissipative means.

i) It is anticipated that glass or optical fiber means may be used instead of ordinary electrical conductors for providing telephone signal transmission between the first location (FL) and the second location (SL); in which case the OTIC cable of FIG. 1 would consist of optical fiber means in combination with electrical conductor means.

Thus, alternatively, the pair of lines labeled FPC in FIG. 1 represent an optical fiber means.

j) The amount of power provided to the fluorescent lighting means (FLM) of FIGS. 1 and 3, is about 40 Watt.

Thus, the amount of power transmitted by way of the electric power transmission path (namely the SPC conductors of FIG. 1) is on the order of many Watt. On the other hand, the amount of power transmitted by way of the telephone transmission path (namely the FPC conductors of FIG. 1) is only on the order of a small fraction of one Watt.

k) To minimize power losses and/or to permit longer transmission distances, it is anticipated that the SPC conductors of the OTIC cable be made of two or more parallel-connected pairs of the multiple individual conductors present in an ordinary telephone installation cable, or—alternatively—be made of heavier gauge conductors.

l) In addition to, or instead of, the fluorescent lighting means (FLM) in FIG. 1, other electric power utilization means may be employed.

Similarly, in addition to, or instead of, the telephone apparatus (TA) of FIG. 1, other telephone signal utilization means may be employed.

For instance, the second location (SL) may harbor a computer terminal connected with the telephone signal transmission means (namely the FPC conductors) as well as with the electric power transmission means (namely the SPC conductors). That way, information transfer may take place by way of the telephone signal transmission means, and Class-2 electrical power transmission for operation of the computer terminal may be provided by way of the electric power transmission means.

m) A telephone utility signal line is herewith defined as that set of electrical conductors, fiber optic means, or radio link means, used for transmitting telephone and/or similar signals between the location of a telephone company's facility and the location of a telephone customer.

n) The amount of electric power available from a telephone utility signal line is on the order of milliwatts.

o) The amount of electric power available from an ordinary electric power line in a home or office, as by way of an ordinary electric wall receptacle means, is on the order of kilo-watts.

p) There is no inherent reason for the magnitude of the power transmitted along-side the telephone utility signal line be limited to 100 Watt. Clearly, by providing for other means for fire-initiation protection, larger amounts of power may safely be provided.

q) It is emphasized that the telephone utility signal line may be used for communications relative to the power being provided therealongside. Thus, for instance, a signal may be generated indicating the magnitude of the current being drawn by the load (or each load); and this signal may be transmitted to the source of power and used to compare the magnitude of the current drawn by the load versus the magnitude of the current being provided from the source. Then, if there be any substantive difference therebetween, potential fire hazard may be indicated (as from an unauthorized load, such as a partial short circuit); and protective measures—such as circuit interruption—could be implemented.

r) A basic concept herein disclosed in that of transmitting conditioned electric power alongside a telephone utility signal line, thereby to provide for a substantive amount of electric power at or near the point of utilization of the telephone signal. A corollary concept is that of transmitting information alongside a power transmission line; in which case information can be transmitted back relative to the utilization of the electric power. In either case, however, because of the immense ratio in magnitude difference between the power level associated with the electric power transmitted and the power level associated with the information signal transmitted, a high degree of separation is needed between the signal transmitting means and the power transmitting means. Consequently, due to the immense differences in transmission frequencies, to attain a high degree of electro-magnetic separation, a fiber optic line would be a particularly suitable signal communication means to be used alongside a power transmitting line.

s) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. An arrangement comprising:
   a) at a first location: i) telephone signal terminal means connected with an ordinary telephone utility signal line, and ii) electric power terminal means connected with a source of electric energy; the electric power terminal means including power limiting means operative, without requiring the breaking of electrical connection between the electric power terminal means and the source of electric energy, to manifestly prevent delivery from the electric power terminals means of electric power in excess of an amount sufficient to represent a fire initiation hazard;

b) at a second location: i) telephone signal utilization means having telephone signal utilization terminal means, and ii) electric power utilization means having electric power utilization terminal means; and c) a signal and power transmission cable means having a telephone signal transmitting line and power transmitting conductors; the cable means being operative to provide telephone signal transmission and electric power transmission between the first location and the second location; the telephone signal transmitting line being connected with the telephone signal terminal means at the first location and with the telephone signal utilization terminal means at the second location; the conductors being connected with the electric power terminal means at the first location and with the electric power utilization terminal means at the second location.

2. The combination of:

a first entity comprising:
  i) first signal terminal means connected in circuit with a first signal means operative to supply and/or receive information signals, such as to and/or from a telephone utility signal line; and
  ii) first power terminal means connected in circuit with a source of electric power, such as an ordinary electric utility power line; the first power terminal means including power limiting means operative, without requiring the breaking of electrical connection between the electric power terminal means and the source of electric energy, to manifestly prevent any power delivered from said first power terminal means from exceeding an amount sufficient to represent a fire initiation hazard;

a second entity comprising:
  i) second signal terminal means connected in circuit with a second signal means operative to receive and/or supply information signals; and
  ii) second power terminal means connected in circuit with an electric power utilization means; and a third entity comprising:
cable means including a signal transmission line and power transmission conductors;
the cable means being operative to provide signal transmission and electric power transmission between the first entity and the second entity; the signal transmission line being connected between the first and the second signal terminal means; the power transmission conductors being connected between the first and the second power terminal means.

3. A signal and power transmission system comprising:
  a power source operative to provide substantive amounts of electric power;
  a load means operative to utilize a substantive amount of electric power;
  a first signal supply/receive means operative to supply and/or receive information signals;
  a second signal supply/receive means operative to supply and/or receive information signals;
  cable means connected in circuit between the power source, the load means, the first and second signal supply/receive means; the cable means integrally having a signal transmission line and a pair of power transmission conductors; and
  safety means connected in circuit with at least the power source and the load means, the safety means being operative, in case an unauthorized load such as a partial short circuit were to be imposed across the power conductors, to prevent such unauthorized load from drawing enough electric power to cause a fire initiation hazard, yet without actually stopping the flow of power to this unauthorized load.

4. The arrangement of claim 3 wherein the signal transmission line is electrically isolated from the power transmission conductors.

5. An arrangement comprising:
  a power source operative to provide electric power from a pair of power terminals;
  a load means operative to utilize electric power;
  a first signal supply/receive means operative to supply and/or receive information signals;
  a second signal supply/receive means operative to supply and/or receive information signals; and
  cable means connected in circuit between the power source, the load means, the first and the second signal supply/receive means; the cable means integrally including a pair of power transmission conductors as well as an optical glass fibre means operative to conduct information signals;
  the arrangement being so constituted that the amount of power delivered from the cable means to the lighting fixture is manifestly limited such as to be substantially safe from fire initiation hazard.

6. An arrangement comprising:
  at a first location: (i) a power source operative to provide electric power from a pair of power terminals, and (ii) a first signal supply/receive means operative to supply and/or receive information signals;
  at a second location; (i) an electric light-producing means, combined with (ii) a second signal supply/receive means operative to supply and/or receive information signals; and
  cable means connected in circuit between the first location and the second location, thereby to conduct: (i) power from the power source to the electric light-producing means, and (ii) information signals between the first and the second signal supply/receive means; the cable means integrally including a pair of power transmission conductors as well as communications conduction means operative to conduct information signals.

7. The arrangement of claim 6 wherein the magnitude of the electric power extractable from the power transmission conductors is limited to a level that is safe from fire initiation hazard.

8. The arrangement of claim 6 wherein, if an inadvertent complete or partial short circuit were to occur between the power transmission conductors, the maximum power than would flow through this complete or partial short circuit would be limited to an amount considered safe from fire initiation hazard.

* * * * *